United States Patent [19]

Braun et al.

[11] Patent Number: 5,592,395
[45] Date of Patent: Jan. 7, 1997

[54] METHOD AND APPARATUS FOR DETERMINING AND EXTENDING A CHANGE INTERVAL FOR AN OPERATING FLUID OF A UNIT

[75] Inventors: Fritz Braun, Kernen; Ursula Felger, Schorndorf; Otto Jung, Stuttgart; Jakob Wojtacki, Wendlingen, all of Germany

[73] Assignee: Mercedes-Benz AG, Stuttgart, Germany

[21] Appl. No.: 203,253

[22] Filed: Mar. 1, 1994

[30] Foreign Application Priority Data

Mar. 1, 1993 [DE] Germany ............................ 43 06 270.9

[51] Int. Cl.$^6$ ...................... F01M 11/04; G01M 17/00; G07C 5/00
[52] U.S. Cl. .................... 364/509; 364/550; 364/424.035
[58] Field of Search ................... 73/53; 123/196; 364/550, 424.03, 509; 340/52 R; 374/103

[56] References Cited

U.S. PATENT DOCUMENTS

| | | | |
|---|---|---|---|
| 4,007,629 | 2/1977 | Hochstein | 73/53 |
| 4,421,078 | 12/1983 | Hurner | 123/196 R |
| 4,495,909 | 1/1985 | Hurner | 123/196 R |
| 4,533,900 | 8/1985 | Muhlberger et al. | 340/52 R |
| 4,629,334 | 12/1986 | Hochstein | 374/103 |
| 4,742,476 | 5/1988 | Schwartz et al. | 364/550 |
| 4,847,768 | 7/1989 | Schwartz et al. | 364/424.03 |
| 4,862,393 | 8/1989 | Reid et al. | 364/550 |

FOREIGN PATENT DOCUMENTS 4038972  7/1991  Germany.

*Primary Examiner*—James P. Trammell
*Assistant Examiner*—Demetra R. Smith
*Attorney, Agent, or Firm*—Evenson, McKeown, Edwards & Lenahan, P.L.L.C.

[57] ABSTRACT

A method and apparatus for determining and extending a change interval for an operating fluid of a unit, particularly for an engine of a motor vehicle, uses at least one directly or indirectly recorded operating variable which represents the qualitative condition of the operating fluid. An evaluation of the at least operating variable and a continuous calculation of the change interval therefrom is performed by a computing and control unit. The calculated change interval is related to a specified unit service interval and, if the change interval expires before the service interval, a regeneration signal for the removal of a certain quantity of the spent operating fluid and the replacement of the quantity with a fresh operating fluid is produced as a function of the difference therebetween.

10 Claims, 2 Drawing Sheets

METHOD AND APPARATUS FOR DETERMINING AND EXTENDING A CHANGE INTERVAL FOR AN OPERATING FLUID OF A UNIT

BACKGROUND AND SUMMARY OF THE INVENTION

The present invention relates to a method and apparatus for determining and extending a change interval for an operating fluid of a unit, comprising the steps of evaluating at least one operating variable representing a qualitative condition of the operating fluid, and continuously calculating therefrom the change interval.

DE 40 38 972 C1 describes a device for calculating a motor-vehicle service interval in which it is possible to precisely calculate a service interval and indicate the necessity of a vehicle inspection to the driver. This known device also makes it possible to extend the service interval thus calculated once by a defined time period or a defined vehicle mileage, i.e. to postpone the next time of inspection as long as an engine-oil addition process has taken place beforehand.

This conventional approach is obviously based on the realization that, although partial replacement of the spent engine oil does not bring about an optimum condition, it does nevertheless guarantee sufficiently reliable engine operation. Particularly in the transportation of goods over long distances by truck or lorry, it is thus still possible to make one or more urgent deliveries reliably before finally bringing the lorry concerned in for inspection. In other words, this automatic one-off extension of the normal service interval means that there is no need for the driver on a freight-hauling trip, for example one which takes him abroad, to feel obliged to carry out the necessary servicing work there and then, on illumination of the relevant warning light. On the contrary, the addition of engine oil or the partial replacement of the spent oil is sufficient to allow him or her to reach home base without difficulty. The step of adding engine oil thus evidently extends the expired service interval on a one-off basis by a defined period of time or a defined mileage, with the calculation of the service interval being based on the qualitative condition of the engine oil.

No account, however, is taken in the known device of the fact that the time at which the change interval determined for the operating fluid (e.g., engine oil) falls due does not in general coincide with the time at which other unit service intervals fall due, for example those service interval times for such units as the brakes, the gearbox, the steering, the suspension etc. As a result, service work in, for example, a vehicle is undertaken at different times, resulting in a plurality of out-of-service periods.

An object on which the present invention is based is therefore to provide a method in which the out-of-service period of the unit does not result from the qualitative condition of the operating fluid.

This object has been achieved in accordance with the present invention by a method and apparatus which operate such that the continuously calculated change interval is related to a specified unit service interval and, if the change interval expires before the service interval, a regeneration signal for removal of a quantity of the spent operating fluid and the replacement of said quantity with a fresh operating fluid is produced as a function of the difference therebetween.

The present invention is based primarily on the discovery that it is possible, by controlled quantitative removal of the regenerable operating fluid in dependence on its qualitative condition and its regeneration by replacing the quantity removed with fresh operating fluid, to extend the change interval thereby, on one hand, allowing the change interval for the operating fluid to be adapted to the service interval of the unit in order to minimize the out-of-service periods and, on the other hand, eliminating the need, in the case of disposal of used operating fluid in a manner contained within the unit, to change the operating fluid during the life of the unit.

BRIEF DESCRIPTION OF THE DRAWINGS

These and other objects, features and advantages of the present invention will become more readily apparent from the following detailed description when taken in conjunction with the accompanying drawings wherein.

DETAILED DESCRIPTION OF THE DRAWINGS

Figure 1:
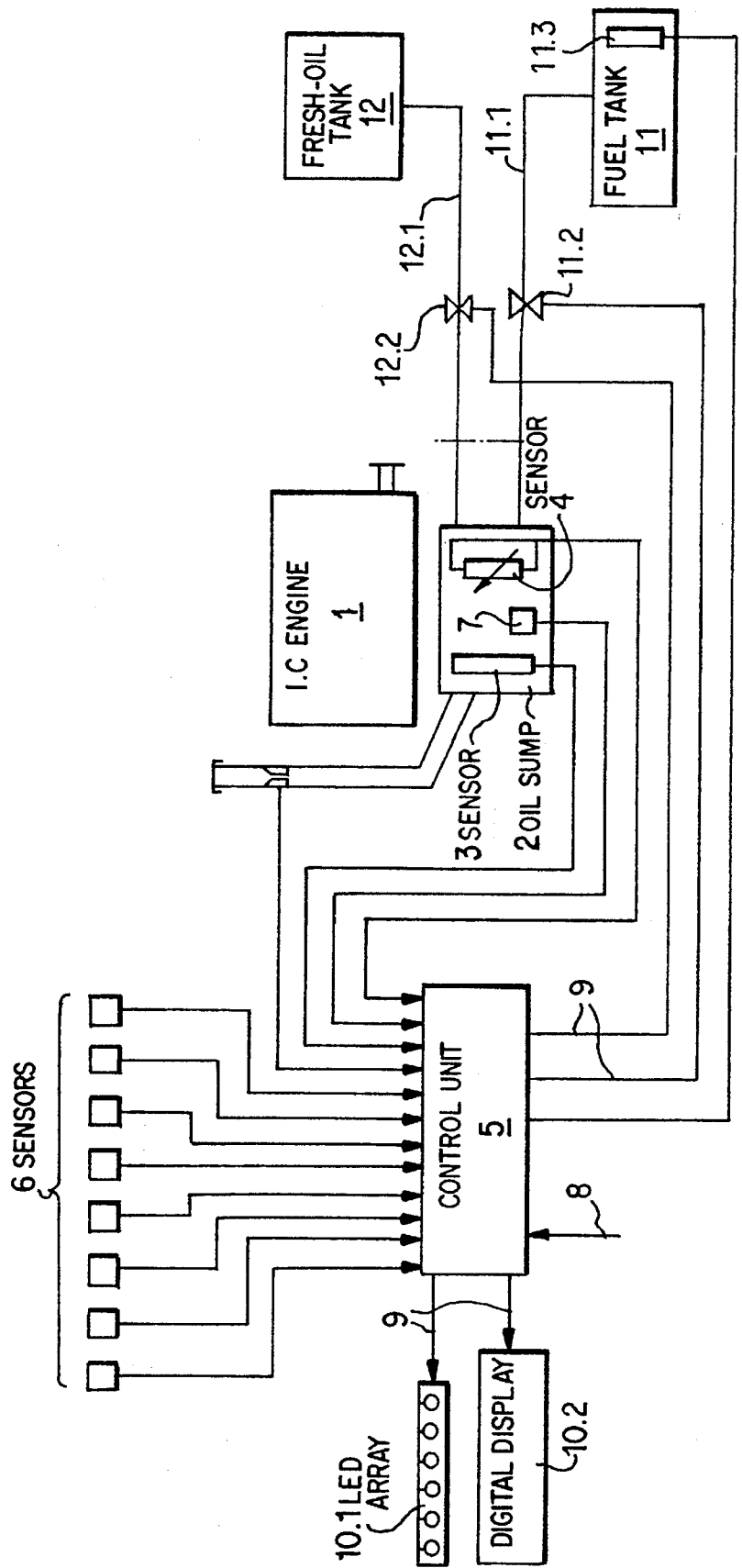
FIG. 1 is a schematic block diagram of a unit with its associated components for carrying out the present invention.

The unit depicted in FIG. 1 is an internal combustion engine 1 with associated motor vehicle oil sump 2. A level sensor 3 and an engine-oil temperature sensor 4 are arranged in the sump 2. The electrical signals from the sensors 3, 4 are fed to a computing and control unit 5, which can be an on-board computer which controls components of the vehicle such as engine operation, gearbox, clutch etc. The computing and control unit 5 has conventional input and output units, data memories and program memories and microprocessors, with these components being interlinked via a bus system.

The computing and control unit 5 is furthermore supplied with other operating variables, determined by sensors 6. These variables can include the number of engine starts, the number of crankshaft revolutions, times for when the vehicle has been in motion and when it has been at rest, engine temperature, engine oil pressure, fuel consumption etc., in the form of electrical signals. From these operating variables, the computing and control unit calculates in a known manner for each stored program, inter alia, a change interval for engine oil, which is an operating fluid. That is, the change interval is thus determined from operating variables which represent the qualitative condition of the operating fluid indirectly.

However, the change interval can also be determined from operating variables which represent directly the qualitative condition of the operating fluid, for which purpose there are known methods such as capacitance, conductivity, viscosity or polarity measurement, etc. This may be symbolized by the measuring device 7 in the oil sump 2.

The computing and control unit 5 is furthermore provided, via an input 8, with a specified unit service interval, which can relate to an engine service or to the servicing of other units, e.g. the gearbox, the brakes etc. Whatever the case, the expiration of the service interval indicates that the vehicle must be serviced, with an associated out-of-service period. The unit service interval can be, for example, specified by manual input or automatically with reference to unit-specific data.

In the computing and control unit 5, the calculated change interval for the operating fluid is then related to the specified unit service interval. If the change interval expires before the service interval, then, depending on the difference therebetween, a regeneration signal 9 is produced and, via an LED array 10.1 and/or a digital display 10.2 (preferably arranged on the dashboard) corresponding information is provided to the operator and can take the following form:

1.5 LITERS REMOVED (of the spent operating fluid), 1.5 LITERS ADDED (of fresh operating fluid).

The quantity removed and the quantity added are preferably determined on the basis of the difference between the intervals, taking into account a maximum possible service life of the operating fluid.

Alternatively, the regeneration signal 9 can also be used for the automatic control of a removal and addition process. Thus, in accordance with FIG. 1, the oil sump 2 is additionally connected, via a removal line 11.1 with a solenoid valve 11.2, to the fuel tank 11, which likewise has a level sensor 11.3, and, via an addition line 12.1 with a solenoid valve 12.2, to a fresh-oil tank 12. The regeneration signal 9 drives the solenoid valves in such a way that the particular quantity of spent operating fluid is removed from the oil sump into the fuel tank and the particular quantity of fresh operating fluid is removed from the fresh-oil tank into the oil sump. The removal of the spent operating fluid is controlled so that it is fed to the fuel tank in an amount which complies with a particular ratio determined by exhaust regulations.

Figure 2:
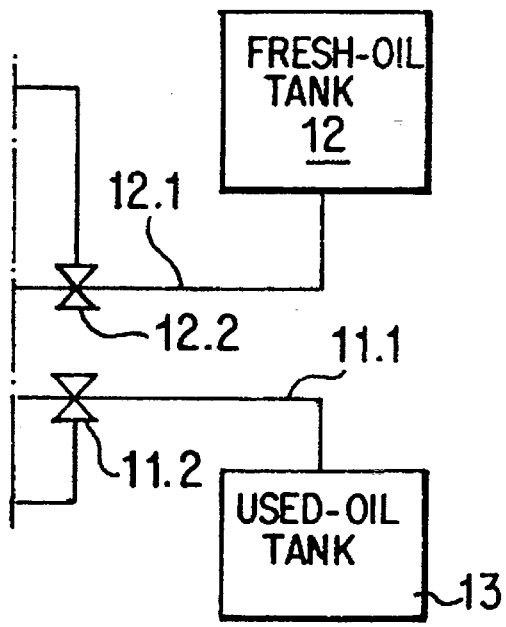
FIG. 2 shows a second embodiment of an operating-fluid tank used in the unit of FIG. 1.

Alternatively, it is also possible, in accordance with the embodiment of FIG. 2, for the spent operating fluid to be fed to a used-oil tank 13 and stored there until the unit has to be taken out of service for some other reason, for example when the service interval falls due.

Figure 3:
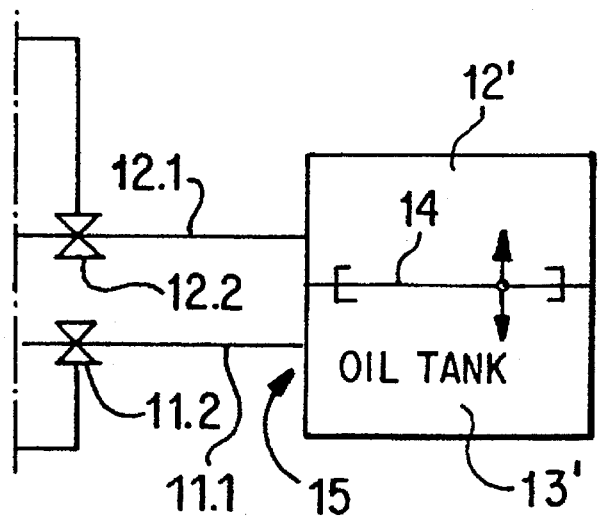
FIG. 3 shows a third embodiment of an operating-fluid tank used in the unit of FIG. 1.

According to the embodiment of FIG. 3, a tank 15 can also be configured such that the spent operating fluid is stored in the space 13' freed by the removal of the additional quantity from the space 12', and the two spaces are separated from one another by a movable mixing barrier 14.

By virtue of the three embodiments described above, disposal of used operating fluid is thus advantageously achieved in a manner contained within the unit. If, during the further operation of the unit after a regeneration of the operating fluid, the newly calculated change interval again expires before the service interval or life of the unit, the removal and addition process can be repeated one or more times.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A method for determining and extending a change interval for an operating fluid of a unit, comprising the steps of evaluating at least one operating variable representing a qualitative condition of the operating fluid, and continuously calculating therefrom the change interval, wherein the continuously calculated change interval is related to a specified unit service interval and, if the change interval expires before the service interval, a regeneration signal for removal of a quantity of the spent operating fluid and the replacement of said quantity with a fresh operating fluid is produced as a function of the difference therebetween.

2. The method according to claim 1, wherein at least one operating variable representing a minimum qualitative condition of the operating fluid for reliable operation of the unit is taken as a basis for the expiration of the change interval.

3. The method according to claim 1, wherein the regeneration signal generates information for an operator.

4. The method according to claim 1, wherein the regeneration signal automatically controls a process of removing from and adding to the unit said quantity of operating fluid.

5. The method according to claim 4, wherein tanks are operatively associated with the unit, via lines and selectively controllable valves arranged therein, are configured to take up spent operating fluid removed and to add fresh operating fluid.

6. An apparatus for determining and extending a change interval for an operating fluid of a motor vehicle engine, comprising means for evaluating at least one operating variable representative of a qualitative condition of the operating fluid and continuously calculating therefrom the change interval related to a specified engine service interval such that, if the change interval expires before the service interval, a regeneration signal is produced, and means for using the regeneration signal to remove a quantity of spent operating fluid from the unit and to add fresh operating fluid to the unit as a function of the difference between the change interval and the service interval.

7. The apparatus according to claim 6, wherein the regeneration signal using means includes apparatus for generating vehicle operator data.

8. The apparatus according to claim 6, wherein tanks are operatively associated with the engine, via lines and selectively controllable valves arranged therein, so as to take up the spent operating fluid and add the fresh operating fluid.

9. The apparatus according to claim 6, wherein the regeneration signal using means is configured to provide automatic control for removing the spent operating fluid and adding the fresh operating fluid.

10. The method according to claim 1, wherein the difference constitutes a difference between the continuously calculated change interval and the specified unit service interval in relation to maximum service life of the operating fluid.

* * * * *